United States Patent
Fratantonio et al.

(10) Patent No.: US 10,858,815 B2
(45) Date of Patent: Dec. 8, 2020

(54) TOILET CARRIER SYSTEM WITH A QUICK CONNECTOR

(71) Applicant: Watts Regulator Co., North Andover, MA (US)

(72) Inventors: Matthew Fratantonio, Northborough, MA (US); Steven Hofmann, Haverhill, MA (US)

(73) Assignee: Watts Regulator Co., North Andover, MA (US)

( * ) Notice: Subject to any disclaimer, the term of this patent is extended or adjusted under 35 U.S.C. 154(b) by 0 days.

(21) Appl. No.: 16/245,578

(22) Filed: Jan. 11, 2019

(65) Prior Publication Data
US 2020/0224400 A1    Jul. 16, 2020

(51) Int. Cl.
*E03D 11/14* (2006.01)
*F16B 7/20* (2006.01)

(52) U.S. Cl.
CPC ............... *E03D 11/14* (2013.01); *F16B 7/20* (2013.01)

(58) Field of Classification Search
CPC ........................................................ E03D 11/14
USPC ................................................ 4/252.1–252.6
See application file for complete search history.

(56) References Cited

U.S. PATENT DOCUMENTS

| | | | |
|---|---|---|---|
| 2,591,060 A | 4/1952 | Garretson | |
| 3,078,477 A | 2/1963 | Schmid et al. | |
| 3,686,695 A | 8/1972 | Mielback et al. | |
| 3,732,582 A | 5/1973 | Mielbeck et al. | |
| 4,058,859 A | 11/1977 | Arrowood | |
| 4,108,477 A | 8/1978 | Morris | |
| 4,979,239 A | 12/1990 | Klein et al. | |
| 6,301,838 B1 | 10/2001 | Hall | |
| 6,928,669 B2 | 8/2005 | Akin | |
| 6,979,027 B2 | 12/2005 | Hetzler et al. | |
| 7,571,497 B2 | 8/2009 | Hetzler et al. | |
| 8,141,177 B1 | 3/2012 | Mojacka et al. | |
| 8,505,124 B2 | 8/2013 | Eichler et al. | |
| 8,544,121 B1 | 10/2013 | Mojacka et al. | |
| 8,657,343 B2* | 2/2014 | Rodenberg | F16L 37/0915 285/319 |
| 9,464,426 B1 | 10/2016 | Schaetzke et al. | |
| 2016/0090726 A1 | 3/2016 | Verdecchia et al. | |
| 2016/0097191 A1* | 4/2016 | Morris | E03D 11/14 4/252.1 |

* cited by examiner

*Primary Examiner* — Christine J Skubinna
(74) *Attorney, Agent, or Firm* — Burns & Levinson, LLP; George N. Chaclas

(57) ABSTRACT

A quick connector assembly for connecting a toilet waste pipe to a drain pipe including a toilet carrier base. A collet has resilient radially inward fingers and a lock body secures the collet in place. The lock body has guide tracks with locked portions that define a locked position and unlocked portions that define an unlocked position. A lock nut includes interior protrusions coupled in the guide tracks for movement between the locked and unlocked positions. A guide is slidingly mounted between the lock nut and lock body. In the unlocked position, the lock nut forces the guide into the collet so that the radially inward fingers are splayed to allow removal of a toilet waste pipe for adjustment. In the locked position, the guide is not forced into the collet so that the radially inward fingers prevent removal of the toilet waste pipe for fast and easy assembly.

13 Claims, 7 Drawing Sheets

TOILET CARRIER SYSTEM WITH A QUICK CONNECTOR

FIELD OF THE TECHNOLOGY

The subject disclosure relates to wall hung toilet technology.

BACKGROUND OF THE TECHNOLOGY

Many toilets are arranged to connect to a drain through the floor of the room. Such toilets can rely on the components resting on the floor to support the weight and assist in making the seal with the waste pipe. In contrast, wall hung toilets, which are widely used in certain circumstances, connect to a drain pipe through a wall rather than through the floor. A wall hung toilet connector facilitates attachment of a wall hung toilet to a waste pipe. A typical connector supports the toilet off the floor and facilitates a fluid-tight connection between a waste pipe coupled to the toilet bowl and a drain pipe which carries wastewater out of the system.

For many reasons, including sanitary concerns, it is important that lasting support and strong, tight seals are made along the wastewater transmission line. Often, wall hung toilets are installed as part of large commercial projects where it can be difficult to quickly install the requisite number of toilet waste systems efficiency while still ensuring a quality seal is made in every case. Typical connectors have a threaded seal between the toilet and the waste pipe. For example, see U.S. Pat. No. 6,979,027 entitled Toilet Carrier and issued on Dec. 27, 2005, which is incorporated herein by reference. Commonly, full or near full assembly must be performed to determine dimensions and make markings for proper fit. Then, disassembly and reworking of the components must occur before final assembly can begin.

SUMMARY OF THE TECHNOLOGY

In view of the above, there is a need for a device which allows for quick and easy installation of wall hung toilets while effectively connecting the wall hung toilet to a drain pipe. In light of the needs described above, in at least one aspect, the subject technology relates to an apparatus that can be quickly and easily assembled and de-assembled but utilized to hold a waste pipe sealed in place between a toilet and a drain pipe.

In one embodiment, the subject technology is directed to a method for mounting a waste pipe to a toilet carrier base comprising the steps of: mounting the toilet carrier base to a wall; attaching a collet to the toilet carrier base by mounting a lock body on the toilet carrier base, the collet having a plurality of resilient radially inward fingers and the lock body having opposing guide tracks with locked portions that define a locked position and unlocked portions that define an unlocked position; coupling a lock nut to the lock body by opposing interior protrusions on the lock nut being inserted in the opposing guide tracks, respectively, for movement between the locked position and the unlocked position; slidingly coupling a guide between the lock nut and lock body, wherein, in the unlocked position, the lock nut forces the guide into the collet so that the plurality of radially inward fingers are splayed to allow insertion and removal of the toilet waste pipe, and, in the locked position, the guide is not forced into the collet so that the at least one radially inward finger prevents removal of a toilet waste pipe inserted therein; inserting a waste pipe into the toilet carrier base and evaluating a fit and size of the inserted waste pipe; setting the lock nut to the unlocked position for removal of the inserted waste pipe; adjusting the inserted waste pipe and reinserting the adjusted waste pipe into the toilet carrier base; and setting the lock nut to the locked position. Adjusting the inserted waste pipe can include cutting the inserted waste pipe or replacing the inserted waste pipe with a waste pipe of a different length. The method can further include the step of retaining an o-ring in the toilet carrier base for providing a water-tight seal to the waste pipe. Also, a spring can be retained between the lock body and guide for biasing the guide away from the collet.

In another embodiment, the subject technology is directed to a kit for connecting a wall-mounted toilet. A toilet carrier base mounts to a wall and couples to the drain pipe. A collet has at least one resilient radially inward finger and a lock body couples to the toilet carrier base to secure the collet. The lock body has at least one guide track having a locked portion that defines a locked position and an unlocked portion that defines an unlocked position. A lock nut has at least one interior protrusion coupled in the at least one guide track for movement between the locked position and the unlocked position. A guide slidingly couples between the lock nut and lock body. The kit also includes a plurality of waste pipes of varying lengths. In the unlocked position, the lock nut forces the guide into the collet so that the at least one radially inward finger is splayed to allow insertion and removal of the waste pipes for review of fit and sizing to select one of the plurality of waste pipes as a proper fit and size. In the locked position, the guide is not forced into the collet so that the at least one radially inward finger prevents removal of the selected waste pipe inserted therein. To create a water-tight seal with the selected waste pipe, an o-ring may be seated in an annular groove formed by the toilet carrier base. Preferably, the collet is fabricated from stainless steel, the lock body has a textured surface for manually mounting to the toilet carrier base, and the lock nut has a textured surface for manually moving the lock nut between the locked and unlocked positions. The kit can also include a spring between the guide and lock body for biasing the guide away from the collet.

Still another embodiment of the subject technology is directed to a quick connector assembly for connecting a toilet waste pipe to a drain pipe including a toilet carrier base. A collet has resilient radially inward fingers and a lock body secures the collet in place. The lock body has guide tracks with locked portions that define a locked position and unlocked portions that define an unlocked position. A lock nut includes interior protrusions coupled in the guide tracks for movement between the locked and unlocked positions. A guide is slidingly mounted between the lock nut and lock body. In the unlocked position, the lock nut forces the guide into the collet so that the radially inward fingers are splayed to allow removal of a toilet waste pipe for adjustment. In the locked position, the guide is not forced into the collet so that the radially inward fingers prevent removal of the toilet waste pipe for fast and easy assembly.

It should be appreciated that the subject technology can be implemented and utilized in numerous ways, including without limitation as a process, an apparatus, a system, a device, a method for applications now known and later developed. These and other unique features of the system disclosed herein will become more readily apparent from the following description and the accompanying drawings.

BRIEF DESCRIPTION OF THE DRAWINGS

So that those having ordinary skill in the art to which the disclosed system pertains will more readily understand how to make and use the same, reference may be had to the following drawings.

DETAILED DESCRIPTION

Figure 1:
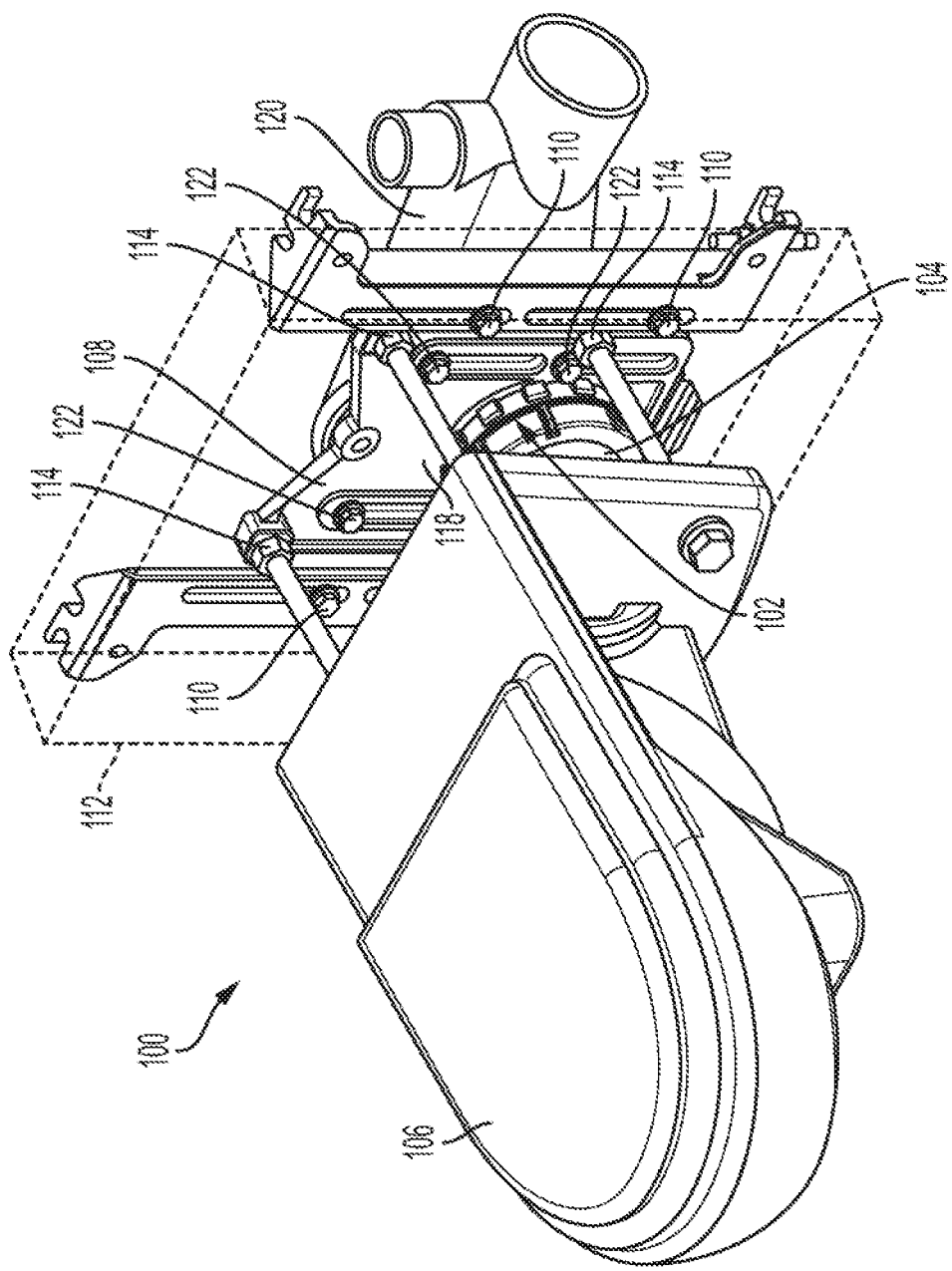
FIG. 1 is a perspective view of a wall hung toilet attached to a toilet carrier system in accordance with the subject technology.

The subject technology overcomes many of the prior art problems associated with wall hung toilets. In brief summary, the subject technology provides a quick connector that seals the waste pipe of a wall hung toilet to a carrier base. Other advantages and features of the systems and methods disclosed herein will become more readily apparent to those having ordinary skill in the art from the following detailed description of certain preferred embodiments taken in conjunction with the drawings which set forth representative embodiments of the subject technology. Like reference numerals are used herein to denote like parts. Further, words denoting orientation such as "upper", "lower", "distal", and "proximate" are merely used to help describe the location of components with respect to one another. For example, an "upper" surface of a part is merely meant to describe a surface that is separate from the "lower" surface of that same part. No words denoting orientation are used to describe an absolute orientation (i.e., where an "upper" part must always be on top).

Referring now to FIG. 1, a perspective view of a mounted wall hung toilet system 100 with a quick connector 102 in accordance with the subject technology is shown. The system 100 is fully assembled, with a quick connector 102 connecting a waste pipe 104 between a toilet 106 and a toilet carrier base 108. Support screws 110 mount the toilet carrier base 108 within the interior of a support structure or wall 112 (shown in phantom), such as a wall of a bathroom. Likewise, the toilet 106 is mounted to the wall 112 by screws 114. The quick connector 102 connects to a flange 116 on the front side 118 of the toilet carrier base 108, as will be discussed in more detail below. The backside of the toiler carrier base 108 connects to a pipe chase 120 by screws 122. The pipe chase 120 directs wastewater through a drain pipe (not distinctly shown) and out of the system 100 (e.g., into a public wastewater system) after the toilet 106 is flushed.

Figure 2:
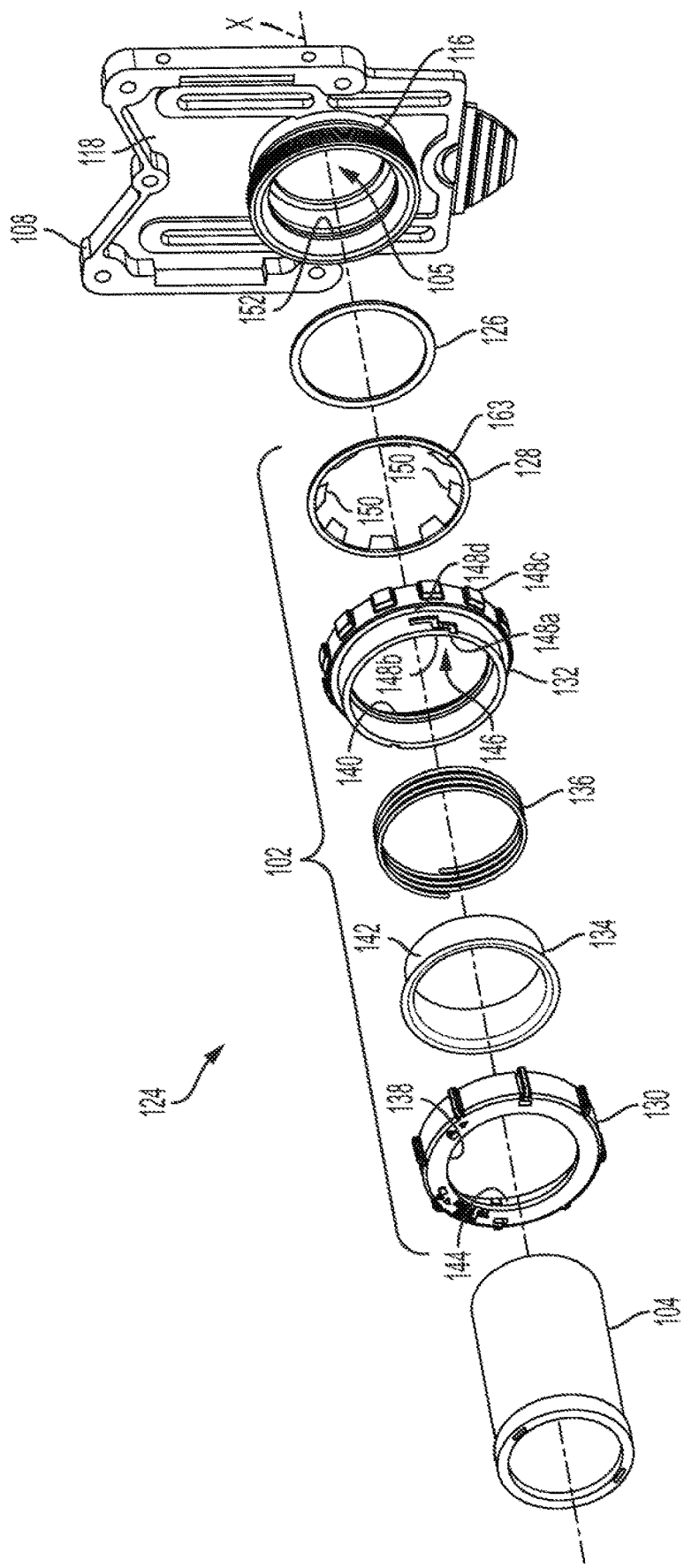
FIG. 2 is an exploded perspective view of components for a toilet carrier system for a wall hung toilet system in accordance with the subject technology.

Referring now to FIG. 2, components of a toilet carrier system 124 for a wall hung toilet in accordance with the subject technology are shown. In particular, FIG. 2 shows an exploded view of the components for the toilet carrier system 124. The toilet carrier system 124 includes the toilet carrier base 108, an o-ring 126, a waste pipe 104, and the quick connector 102. The quick connector 102 includes a collet 128, a lock nut 130, a lock body 132, and a guide 134 and spring 136.

The waste pipe 104 is fully inserted fits into a central opening 105 of the toilet carrier base 108 until the distal end abuts a banking surface 109 (best seen in FIG. 6C). The o-ring 126 fits in an interior annular groove 152 to seal the waste pipe 104. The waste pipe 104 also passes through the quick connector 102. When the quick connector 102 is in the locked position, the waste pipe 104 is locked in place. However, when the quick connector 102 is in the unlocked position, the waste pipe 104 can freely be inserted in and out of position. As a result, the technician can easily partially assemble toilet carrier system 124, insure that fit is correct or make adjustments as needed, then quickly and easily attend to final assembly.

Figure 3:
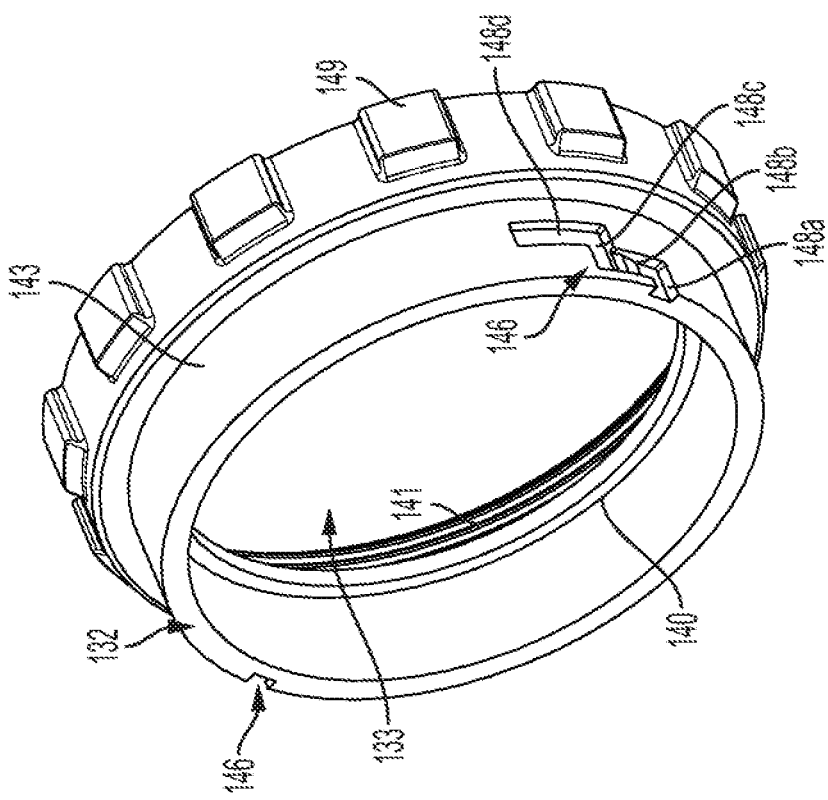
FIG. 3 is a perspective view of a lock body for a toilet carrier system in accordance with the subject technology.

FIG. 3 shows a zoomed in perspective view of a lock body 132. The lock body has a central opening 131 for receiving the waste pipe 104. A threaded distal end 141 of the lock body 132 screws on to the threaded flange 116. A sidewall 143 extends from the end 141 and defines two opposing guide tracks 146. Each guide track 146 has an insertion portion 148a, a locked portion 148b, a transition portion 148c, and an unlocked portion 148d.

The portions 148a-148d (generally 148) are generally substantially orthogonal to the adjacent portion but may also be at angles. In the exemplary embodiment, the insertion portion 148a extends in a first direction substantially parallel to the central axis x. The locked portion 148b runs orthogonal to the insertion portion. The transition portion 148c then runs substantially orthogonal to the locked portion 148c, and substantially in same direction as the insertion portion 148a (e.g., parallel to the central axis x). The unlocked portion 148d then runs substantially orthogonal to the transition portion 148c, and substantially in the same direction as the locked portion 148b.

Figure 4:
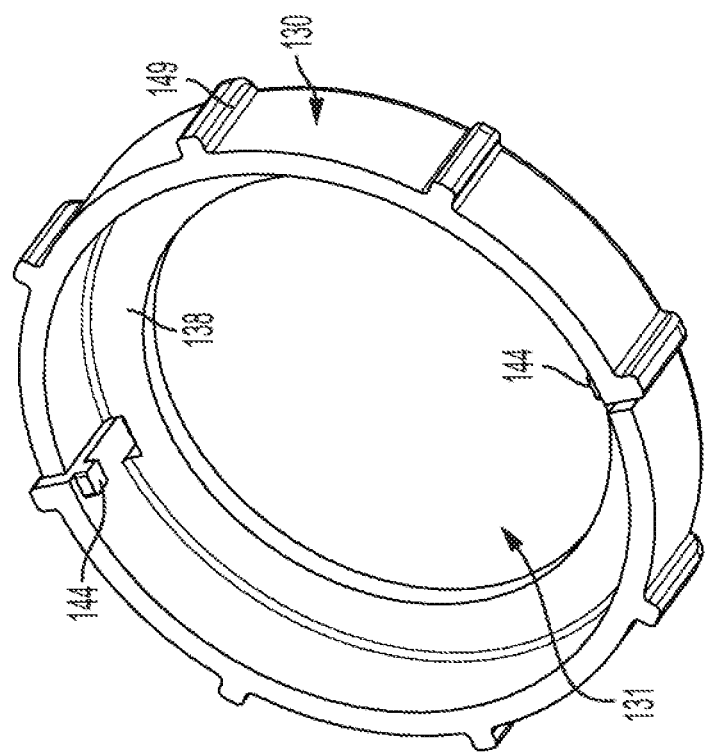
FIG. 4 is a perspective view of a lock nut for a toilet carrier system in accordance with the subject technology.

FIG. 4 shows a zoomed in perspective view of a lock nut 130. The lock nut 130 also has a central opening 131 for receiving the waste pipe 104. The lock nut 130 has two opposing interior protrusions 144, which insert into respective guide track 146 of the lock body 132. It is envisioned that any number of complimentary protrusions and tracks may be utilized. Two or three of each provides an effective stable engagement. The protrusions can be various sizes and shapes, even a spring loaded button, but is sized and designed to fit comfortably inside of the guide tracks 146. Both the lock nut 130 and lock body 132 have textured outer surfaces 149 to allow for easy assembly by hand.

Figure 5:
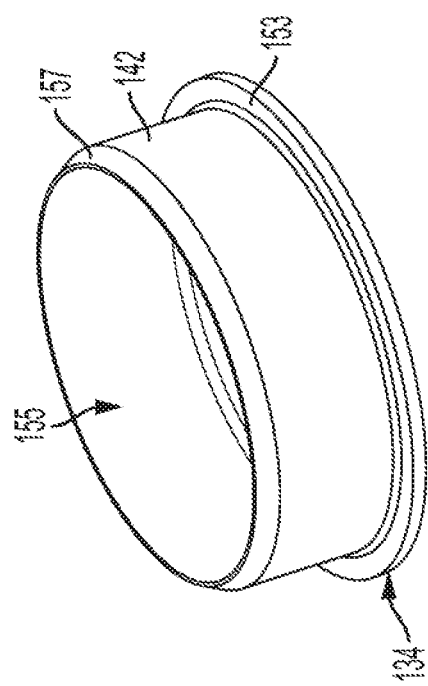
FIG. 5 is a perspective view of a ferrule guide for a toilet carrier system in accordance with the subject technology.

Referring now to FIG. 5, a perspective view of a ferrule guide 134 for a toilet carrier system in accordance with the subject technology is shown. The guide 134 has a proximal rim 153 with a sidewall 142 extending from the proximal rim 153 to form another central opening 155. The central opening 155 is coaxial with the central opening 133 of the lock body 132 and the central opening 131 of the lock nut 130. The sidewall 142 has a beveled distal edge 157.

Figure 6:
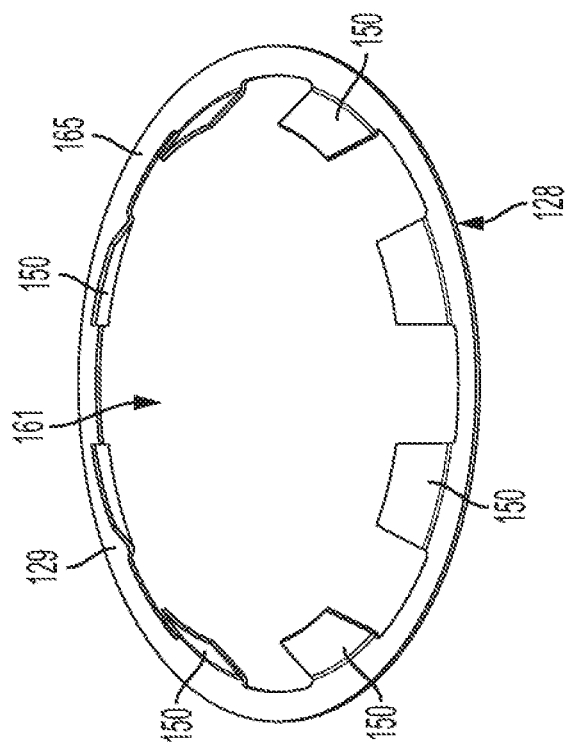
FIG. 6 is a perspective view of a collet for a toilet carrier system in accordance with the subject technology.

Referring now to FIG. 6, a perspective view of the collet 128 in isolation is shown. The collet 128 is a radial ring 129 with a proximal side 163 and a distal side 165. The collet 128 also has a central opening 161. Eight resiliently flexible fingers 150 extend from the ring 129 at an angle inward away from the distal side 165 (i.e., slightly in a distal direction). In other embodiments, a different number of fingers are used. The collet 128 is sized so that the waste pipe 104 can pass easily through the central opening when inserted distally. However, if a technician were to try and extract the waste pipe 104 by pulling in a proximal direction, the fingers 150 would engage the waste pipe 104, acting as barbs, that would prevent proximal movement.

Figure 7A:
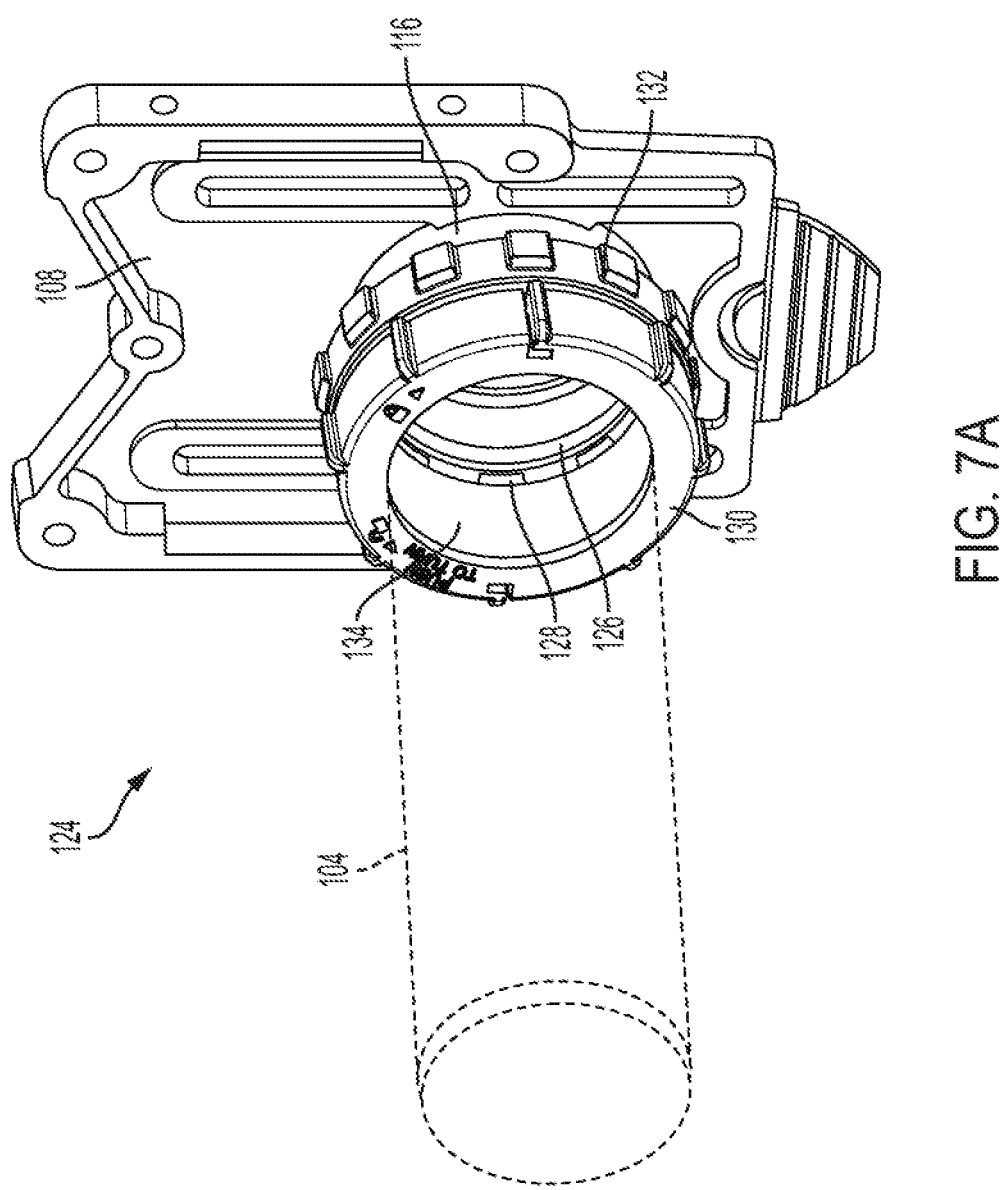
FIG. 7A is a perspective view of assembled components of a toilet carrier system in accordance with the subject technology.
Figure 7B:
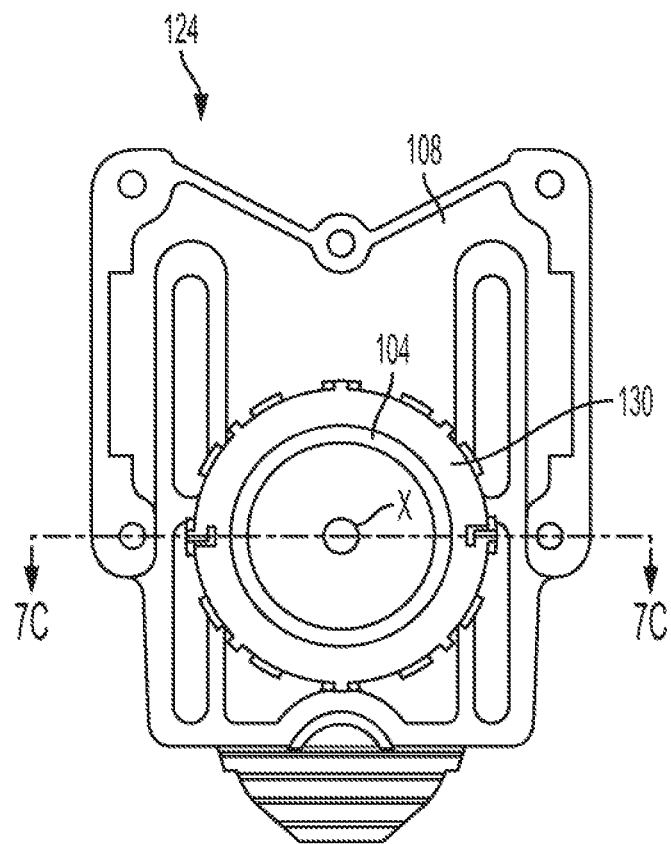
FIG. 7B is a front view of a portion of the system of FIG. 6A.
Figure 7C:
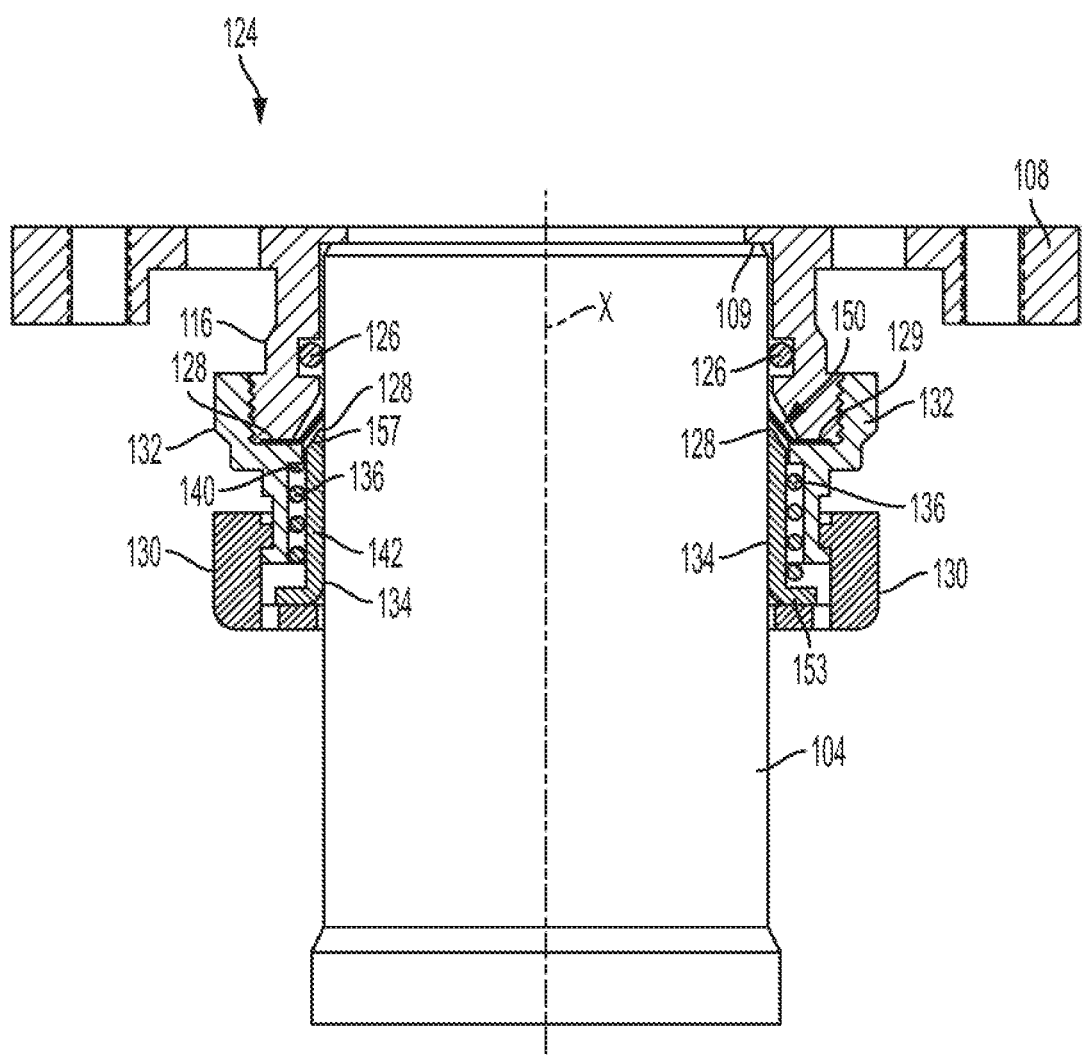
FIG. 7C is a vertically sliced cross section of a portion of the system of FIG. 6A.

Referring now to FIGS. 7A-C, perspective, front and cross-sectional views of the assembled toilet carrier system 124 are shown, respectively. In FIG. 7C, the quick connector 102 is shown in the locked position so that the waste pipe 104 can be inserted into the base 108 through the quick connector 102 but not extracted. When the quick connector 102 is assembled, the proximal rim 153 of the guide 134 nestles inside the nut 130. The spring 136 surrounds the guide sidewall 142. The protrusion 144 slide into the insertion portion 148a of the guide track 146 of the lock body 132. With a slight compression and rotation, the protrusions 144 can be moved into the locked portion 148b of the guide track 146. The spring 136 becomes compressed between the guide rim 153 and the ridge 140 of the lock body 132. The spring force proximally biases the guide 134 away from the lock body 132, which creates a force upon the lock nut 130 to help restrain movement of the protrusions 144 in the guide track 146. As a result, the quick connector 102 will securely remain in the locked position (e.g., the protrusions 144 in the locked portion 148b of the guide track) until moved by the technician.

The o-ring 126 is seated in the annular groove 152 of the base 108. The proximal side 163 of the collet 134 is nestled within the lock body 132. Then, the lock body 132 is threaded onto the base flange 116 so that the radial ring 129 of the collet 134 is captured. As noted above, once the quick connector 102 is set in the locked position and threaded on to the base 108 to hold the collet 134 in place, the waste pipe 104 may simply be inserted to butt against the base banking surface 109 to complete installation. However, as is often the case, upon initial assembly, adjustment such as using a different length waste pipe 104 may be needed for installation of the toilet 106. The technician may be provided with a kit of various length waste pipes or mark and cut the waste pipe on site. In any case, once the proper waste pipe 104 is ready, the quick connector 102 may be in the locked or unlocked position during insertion but once the waste pipe 104 is in place, the quick connector 102 is set to the locked position to complete assembly. The waste pipe 104 is sealed to the toilet carrier base 108 by the o-ring 126 in a watertight manner.

To remove the waste pipe 104, the quick connector 102 is moved to the unlocked position by compression and rotation of the lock nut 130. As a result, the protrusions 144 slide through the transition portion 148c of the guide track 146 into the unlocked portion 148d. This axial movement of the lock nut 130 in the distal direction overcomes the spring force and pushes the beveled edge 157 of the guide 134 into the fingers 150 of the collet 128. The beveled edge 157 splays the resilient fingers 150 radially outward to prevent the fingers 150 from engaging the waste pipe 104. Hence, the waste pipe 104 can simply be slid out of the quick connector 102 in the unlocked position for adjustment and replacement multiple times, as needed, without any tools. As can be seen, the assembly not only does not require tools, but can be performed quickly and easily by the technician so that checking and adjustment is an efficient operation.

In the example shown, quick connect components 102, collet 128, flange 116, and waste pipe 104 are all substantially cylindrical, forming an interior cylindrical tunnel to accept the cylindrical waste pipe 104 but other configurations can utilize the subject technology. The collet 126 and fingers 150 can be of a material of a greater hardness than the waste pipe 104. For example, the waste pipe 104 can be a PVC or plastic material while the collet 128 can be a metal, such as stainless steel, allowing the fingers 150 of the collet 128 to dig into the exterior of the waste pipe 104 and prevent movement out of the flange 116.

The quick connector 102 in accordance of the subject technology allows for rapid assembly of the quick connector 102 parts out of the box, while still maintaining an effectively sealed waste pipe 104 between a toilet 106 and a drain. In one exemplary use, the quick connector 102 can be used in large commercial building construction to install many toilets 106 quickly and efficiently. In such a case, the construction crew can first fix toilet carrier bases 108 to walls 112 at locations where toilets 106 will be installed. A technician can then arrive with just the quick connector 102 parts (and related parts and kits such as o-rings 126 and/or various waste pipes 104 as necessary), quickly locking the quick connectors 102 into place on each toilet carrier base 108, then inserting the waste pipe 104 therein to substantially complete the toilet carrier system 124. If adjustments are required, the quick connector 102 is set to the unlocked position to remove the waste pipe 104 and adjust/reassemble. The toilets 106 can then be attached to the exposed end of each waste pipe 104 to complete installation of the toilet system 100. Thus, installation of the major components of the toilet carrier system 124 for each toilet 106 can be installed separately from the toilet 106 and the carrier base 108, and with only a few simple manual steps completed by an installation technician.

It will be appreciated by those of ordinary skill in the pertinent art that the functions of several elements may, in alternative embodiments, be carried out by fewer elements or a single element. Similarly, in some embodiments, any functional element may perform fewer, or different, operations than those described with respect to the illustrated embodiment. Also, functional elements shown as distinct for purposes of illustration may be incorporated within other functional elements in a particular implementation.

While the subject technology has been described with respect to preferred embodiments, those skilled in the art will readily appreciate that various changes and/or modifications can be made to the subject technology without departing from the spirit or scope of the subject technology. For example, each claim may depend from any or all claims in a multiple dependent manner even though such has not been originally claimed.

What is claimed is:

1. A kit for connecting a wall-mounted toilet comprising:
   (a) a planar toilet carrier base for mounting to a wall and coupling to a drain pipe, the planar toilet carrier base having a flange;
   (b) a manually releasable connector assembly coupled to the flange including:
      a collet having at least one resilient radially inward finger;
      a lock body coupled to the flange of the planar toilet carrier base to secure the collet, the lock body having at least one guide track having a locked portion that defines a locked position and an unlocked portion that defines an unlocked position;
      a lock nut having at least one interior protrusion coupled in the at least one guide track for movement between the locked position and the unlocked position; and
      a guide slidingly coupled between the lock nut and lock body; and
   (c) a plurality of waste pipes of varying lengths, each of the plurality of waste pipes for coupling to the wall-mounted toilet, wherein, in the unlocked position, the lock nut forces the guide into the collet so that the at least one radially inward finger is splayed to allow insertion and removal of the waste pipes for review of fit and sizing to select one of the plurality of waste pipes as a proper length, fit and size, and in the locked position, the guide is not forced into the collet so that the at least one radially inward finger prevents removal of the selected waste pipe inserted therein.

2. The kit as recited in claim 1, further comprising an o-ring seated in an annular groove formed by the planar toilet carrier base for creating a water-tight seal with the selected waste pipe.

3. The kit as recited in claim 1, wherein the collet is fabricated from stainless steel and the at least one resilient radially inward finger is eight fingers.

4. The kit as recited in claim 1, wherein the lock body has a textured surface for manually mounting to the planar toilet carrier base and the lock nut has a textured surface for manually moving the lock nut between the locked and unlocked positions.

5. The kit as recited in claim 1, wherein the at least one guide track is two opposing guide tracks and the at least one interior protrusion is two opposing interior protrusions.

6. The kit as recited in claim 1, further comprising a spring between the guide and lock body for biasing the guide away from the collet.

7. A quick connector assembly for connecting a toilet waste pipe for a wall hung toilet to a drain pipe chase comprising:

a toilet carrier base for mounting to a wall, the toilet carrier including: a planar frame having a backside for coupling to the drain pipe chase; and the planar frame having a front side with an upstanding flange;

a collet having at least one resilient radially inward finger;

a lock body coupled to the flange of the toilet carrier base to secure the collet therebetween, the lock body having at least one guide track having a locked portion that defines a locked position and an unlocked portion that defines an unlocked position;

a lock nut having at least one interior protrusion coupled in the at least one guide track for movement between the locked position and the unlocked position; and a guide slidingly coupled between the lock nut and lock body, wherein, in the unlocked position, the lock nut forces the guide into the collet so that the at least one radially inward finger is splayed to allow insertion and removal of a toilet waste pipe, and in the locked position, the guide is not forced into the collet so that the at least one radially inward finger prevents removal of a toilet waste pipe inserted therein.

8. A method for mounting a waste pipe to a toilet carrier base comprising the steps of:

separately mounting the toilet carrier base to a wall, wherein the toilet carrier base is planar with a flange extending from a front side;

attaching a collet to the toilet carrier base by mounting a lock body on the flange of the toilet carrier base, the collet having a plurality of resilient radially inward fingers and the lock body having opposing guide tracks with locked portions that define a locked position and unlocked portions that define an unlocked position;

coupling a lock nut to the lock body by opposing interior protrusions on the lock nut being inserted in the opposing guide tracks, respectively, for movement between the locked position and the unlocked position;

slidingly coupling a guide between the lock nut and lock body, wherein, in the unlocked position, the lock nut forces the guide into the collet so that the plurality of radially inward fingers are splayed to allow insertion and removal of the toilet waste pipe, and, in the locked position, the guide is not forced into the collet so that the at least one radially inward finger prevents removal of a toilet waste pipe inserted therein;

inserting a waste pipe into the flange of the toilet carrier base, setting the lock nut to the locked position, and evaluating a fit and size of the inserted waste pipe;

setting the lock nut to the unlocked position for removal of the inserted waste pipe;

adjusting the inserted waste pipe based upon the fit and reinserting the adjusted waste pipe into the flange of the toilet carrier base; and setting the lock nut to the locked position.

9. The method as recited in claim 8, wherein adjusting the inserted waste pipe includes cutting the inserted waste pipe.

10. The method as recited in claim 8, wherein adjusting the inserted waste pipe includes replacing the inserted waste pipe with a waste pipe of a different length.

11. The method as recited in claim 8, further comprising the step of retaining an o-ring in the toilet carrier base for providing a water-tight seal to the waste pipe.

12. The method as recited in claim 8, further comprising the step of retaining a spring between the lock body and guide for biasing the guide away from the collet.

13. The quick connector assembly of claim 7, wherein the flange forms an inner annular groove and further comprising an o-ring in the inner annular groove configured to seal the toilet waste pipe.

\* \* \* \* \*